3,322,445
BALL JOINT SEAL
Morris Hassan, Trenton, Mich., assignor to Chrysler Corporation, Highland Park, Mich., a corporation of Delaware
Filed Oct. 13, 1964, Ser. No. 403,498
8 Claims. (Cl. 287—90)

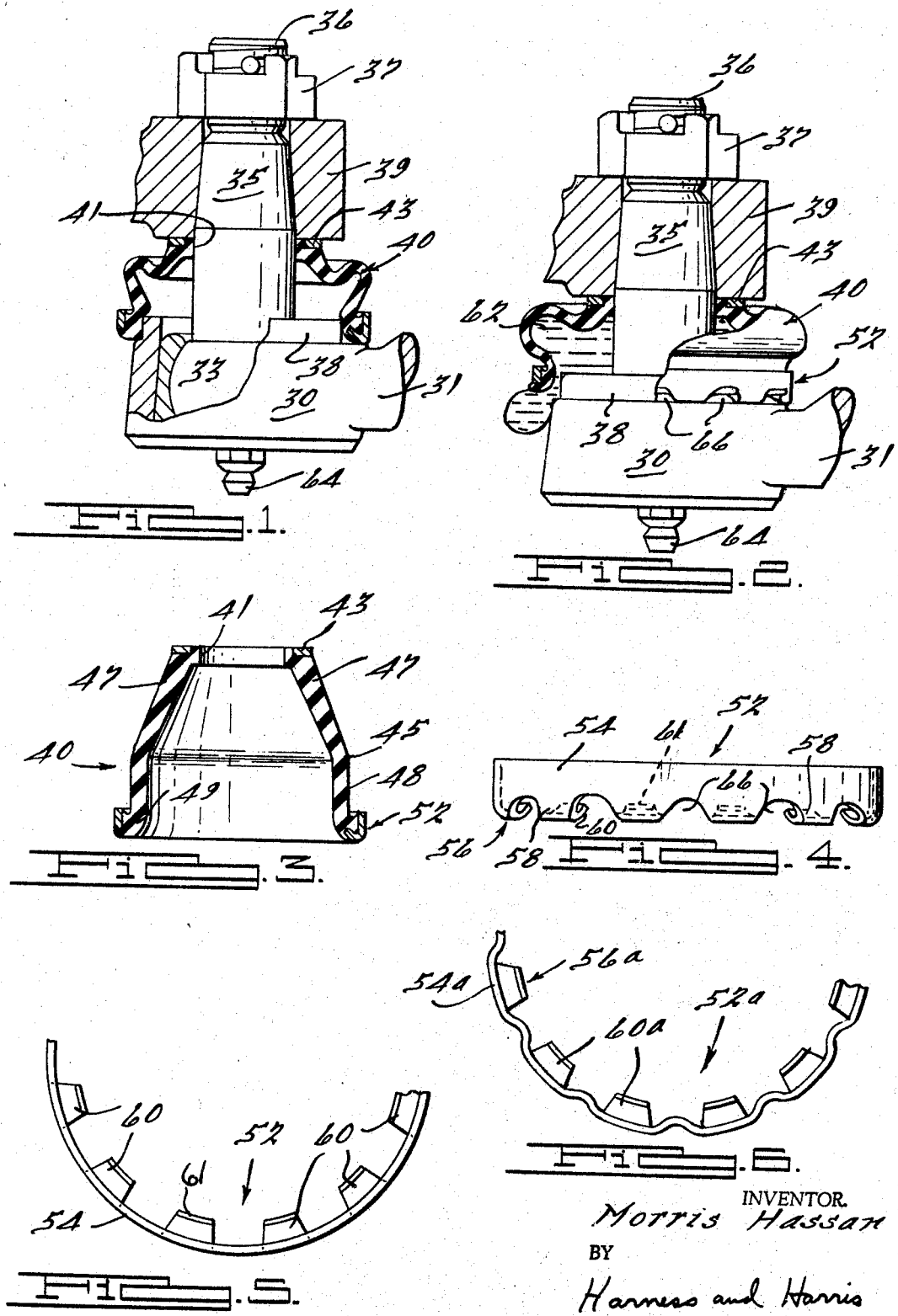

This invention relates to ball joint seals and particularly to seals of the type used on motor vehicle suspension and tie rod ball joint assemblies.

It is a primary object of this invention to provide ball joint, balloon-type, flexible seals that give maximum sealing against the ingress to the joint interior of dirt, water or other foreign matter while providing complete freedom of movement between the joint connected elements and retention of the seal enclosed lubricant.

It is another object to provide an improved type of ball joint seal that will lend itself to permanent or semi-permanent joint lubrication.

It is another object to provide a flexible, balloon-type ball joint seal that lends itself to reliable sealing with maximum joint flexibility while resisting any tendency of the seal to collapse or to leak lubricant.

It is still another object to provide balloon-type lubricant retaining seal that has improved sealing portions to engage the associated stud and ball joint housing or casing so that maximum sealing with minimum wear may be achieved in a seal design that is economical to manufacture and easy to install.

It is still another object to provide a washer for a sealing boot which functions to provide a positive, lifetime sealing connection between the seal and its support as well as a self closing bleed bore for lubricant.

Yet another object is to provide a washer as aforesaid which has a relatively small diameter so as to reduce the overall diameter of the seal assembly.

Yet another object is to provide a washer as aforesaid which is readily expansible radially to accommodate ball joint housings of varying diameter.

Other objects, features and advantages of the invention will be apparent from the following detailed description of a preferred embodiment of the invention and from the accompanying drawings wherein:

FIGURE 1 is a sectional fragmentary elevational view of a vehicle tie rod ball joint assembly embodying one form of this invention;

FIGURE 2 is a fragmentary sectional elevational view similar to FIGURE 1, but showing the expansion of the resilient seal during a pressure fill of the seal with lubricant;

FIGURE 3 is a sectional elevational view of the seal shown in FIGURES 1 and 2, showing the seal in its unstressed condition before incorporation in a ball joint assembly;

FIGURE 4 is a side view on an enlarged scale of a locking washer embodying features of the invention;

FIGURE 5 is a fragmentary top view of the washer of FIGURE 4; and

FIGURE 6 is a fragmentary top view of a modified form of locking washer.

Referring first to FIGURE 1, the tie rod ball joint assembly shown therein includes a ball joint housing 30 formed as an enlarged integral end of a tie rod 31 and defining a substantially hemispherical cavity adapted to rotatably journal the ball shaped head 33 of a stud 35. Stud 35 has the threaded end 36 of its shank portion fixedly connected to a link arm 39 by means of a nut 37, the arm 39 thus serving as a support member for the stud. The upper end of the ball joint housing 30 has an integral collar 38 that provides a suitable annular outer surface against which to seat the lower end of a flexible, balloon-type seal 40. It is the balloon seal 40 that embodies this invention.

Balloon seal 40 is of rubber-like material. A high quality molded neoprene rubber is particularly suitable for balloon seals of the type herein disclosed. Seal 40 is of substantially inverted cup shape with an opening 41 in the top wall to sealingly receive the shank portion of the stud 35. Embedded in the top of the seal 40 is a wear resistant washer 43. The exposed upper annular surface of washer 43 sealingly seats against the lower surface of link arm 39.

As best seen in FIGURE 3, the side walls of seal 40 are shaped so as to resist rupturing and maintain optimum shape during service. The top portions 47 of the seal side walls are relatively thick adjacent the seal top and diverge downwardly while at the same time reducing in wall thickness until a point 45 is reached where the seal side wall becomes substantially vertical. The substantially vertical wall portion 48 is a cylinder of substantially uniform wall thickness and extends from the termination of the upper wall portion 47 to substantially the bottom of the seal. At the lower end of the vertical wall portion 48 the seal walls thicken out to form a radially outwardly extending collar or flange 49.

A locking washer 52, representing the major improvement in this seal over the prior art, is embedded in the flange 49 concentric with the axis of stud 35. Washer 52, as will become apparent hereinafter, provides a one-way locking device for easy mounting and positive locking of the lower end of the seal 40 on the associated housing flange 38. It also allows lubricant under pressure in excess of a certain predetermined value to escape from the seal 40 so as not to rupture the seal during a pressurized filling operation.

As best seen in FIGURES 4 and 5, washer 52 includes a cylindrical main body portion 54 and teeth 56 integral with one end of the main body portion. Each tooth 56 includes a portion 58 extending downwardly (as viewed in FIGURE 4) away from main body portion 54 followed by a portion 60 extending radially inwardly and upwardly. As seen in FIGURE 1, with washer 52 embedded in flange 49 of seal 40 and flange 49 fitted over collar 38, main body portion 54 assumes a position concentric with the axis of stud 35, the portions 58 of teeth 56 extend downwardly and axially away from main body portion 54, and teeth portions 60 slope radially inwardly toward link arm 39 and engage at their tips with collar 38. Because of this sloping arrangement of the teeth portions 60, when the seal is pushed downwardly over collar 38 of housing 30, portions 60 readily bend upwardly so that relatively little force is required to mount the seal on the housing. Mounting of the seal is also made easier by the fact that the axially extending teeth portions 58 readily pivot at their points of juncture with main body portion 54 to allow radially extending teeth portions 60 to spread apart to accommodate collar 38. This double yielding action of teeth 56 (i.e., the outward flexing of portions 58 about their junction with body portion 54 and the upward flexing of portions 60 about their junction with portions 58) also allows seal 40 to expand to sealingly and readily accommodate ball joint housings of varying diameter. However, if removal of the seal is attempted, then considerably more force is required since an upward pull on the seal tends to flatten out the biting teeth portion 60 against the collar 38. In certain forms of this invention it has been found that, while only 170–180 pounds of force was required for installation of the seal, force in the range of 1400 to 1600 pounds was required for removal of the seal. This positive anchoring of the seal to the housing 38 insures that a lifetime seal will be maintained that will exclude the entry of dirt or other foreign matter to the seal interior through the bottom end thereof.

It will be noted that the rubber-like material that forms the seal body also covers the inner end edges 61 of the washer teeth so that a good compression seal will be achieved between the teeth and collar 38. Also, because the teeth ends are covered with a film of rubber-like material, there is little chance of any rusting occurring at the locations where the teeth ends bitingly engage collar 38.

Since washer 52, except at its outer peripheral face, is embedded in flange 49, there normally is a complete circular edge of rubber-like material sealingly engaging the collar 38. However, when the seal interior is to be filled with a suitable lubricant (seen at 62 in FIGURE 2) by connection of a pressurized lube gun to lube fitting 64, the openings 66 formed between the axial portions 58 of the adjacent teeth function to insure complete filling of the seal interior with lubricant without danger of rupture of the seal material.

As seen in FIGURE 2, after filling of the seal interior with lubricant 62, the rubber-like material surrounding the washer openings 66 is expanded or bulged radially outwardly through these openings to permit excess lubricant to bleed out of the seal interior and prevent rupture of the seal. The sealing edge of the seal normally contracts against the collar 38 to provide a tight sealed connection that will prevent the entry of dirt, water or other foreign matter to the seal interior while retaining the lubricant within the seal 40 for the life of the ball joint. Seal 40 thus provides a rupture proof seal with no fixed bleed port, but means to automatically provide a bleed port whenever a critical internal pressure develops within the seal.

The upper end of the seal boot 40 has a surface-to-surface seal between the washer 43 and the under-surface of the link arm 39. This surface-to-surface seal gives a lifetime seal and does not include a permanent bleed bore that could permit loss of lubricant or the entry of water, dirt or other foreign matter to the seal interior.

In the modified form of washer shown in FIGURE 6, the main body portion 54a of washer 52a is scalloped between adjacent teeth 56a. This scalloping allows main body portion 54a to increase its diameter during mounting and thereby further increase the ability of the washer to selectively enlarge itself to sealingly accommodate ball joint housings of varying diameter.

The lubricant retaining seals shown provide what is currently termed "permanently lubricated ball joints" in the motor vehicle industry. These joints extend the period of inspection for service from the prior required 2,000 mile interval to an approximately 32,000 mile interval. Because of the positive locking washer connection of the seal to the associated housing wall, a better seal retention is provided that excludes dirt, water and foreign matter from the seal interior while retaining the maximum lubricant within the seal interior for long lasting lubrication. The self sealing bleed bores resulting from the toothed washer construction insure complete filling of the seal interior with lubricant under pressure without danger of seal rupture. The locking teeth on the seal washer 52 provide a positive one-way lock that is easy to install, but difficult to remove or dislodge. The teeth also impart yieldability to the seal so that it can sealingly engage ball joint housings of varying diameter. The rubber coating on the teeth and adjacent washer portions gives an excellent sealed connection without creating rust development areas. Further, the L-shaped configuration of the washer teeth allow the washer to assume a minimum diameter, thereby reducing the outside diameter of the ball joint assembly to facilitate its usage in extremely tight quarters.

While preferred embodiments of the invention have been shown and described, it will be understood that various changes may be made in the preferred embodiments without departing from the scope or spirit of the invention as defined by the appended claims.

I claim:
1. A ball joint assembly comprising:
(A) a ball joint stud having a ball head at one end;
(B) a support member fixedly receiving the other end of said stud;
(C) a ball joint housing rotatably journaled on said ball head;
(D) a resilient, thin-walled cup shaped element of rubber-like material including
  (1) a bottom end wall portion having an opening therein sealingly engaging the shank of said stud adjacent said support member,
  (2) a peripheral flange portion adjacent the cup open end, sealingly engaging said ball joint housing, and
  (3) side wall portions extending between said bottom wall portion and said flange portion to sealingly interconnect said support member and said ball joint housing; and
(E) a washer embedded in said flange portion and including
  (1) a cylindrical main body portion holding said flange portion against said housing and concentric with the axis of said stud, and
  (2) teeth portions extending axially from one end of said main body portion to define a plurality of openings therebetween and thereafter extending radially inwardly from said main body portion to assist in the sealing engagement of said housing, the rubber-like material of said cup shaped element being sufficiently flexible to allow it to be bulged radially outwardly through said openings to provide self-closing bleed passageways for lubricant.

2. A ball point assembly according to claim 1 wherein:
(A) said one end of said cylindrical main body portion is the end remote from said support member, and
(B) at least some of said radially inwardly extending teeth portions slope toward said support member, whereby to resist removal of said cup-shaped element from said housing.

3. A ball joint assembly according to claim 1, wherein said main body portion is undulated, when viewed in a plane normal to the central axis thereof, over at least a portion of its circumference, whereby to allow radial expansion of said washer to accommodate ball point housings of varying diameter.

4. A ball point assembly according to claim 1 and further including:
(A) a rigidifying ring bonded to said bottom end wall portion and surrounding said opening and having an outer face arranged to have bearing contact with the adjacent face of said support arm.

5. A ball point assembly comprising:
(A) a ball joint stud having a ball head at one end;
(B) a support member fixedly receiving the other end of said stud;
(C) a ball joint housing rotatably journaled on said ball head;
(D) a resilient, thin-wall, cup-shaped element of a rubber-like material including
  (1) a bottom end wall portion having an opening therein sealingly engaging the shank of said stud adjacent said support member,
  (2) a peripheral flange portion adjacent the cup open end sealingly engaging the ball joint housing, and
  (3) side wall portions extending between said bottom wall portion and said flange portion to sealingly interconnect said support member and said ball joint housing; and
(E) a washer embedded in said flange portion and including
  (1) a cylindrical main body portion holding said flange portion against said housing and concentric with the axis of said stud, and (2) spaced teeth portions integral with one end of said main body portion and each including (a) a portion extending axially from said one end followed by (b) a portion extending radially inwardly, whereby to form L-shaped teeth to grip said ball joint housing at their free ends and define a plurality of openings between the axially extending portions thereof, the rubber-like material of said cup shaped element being sufficiently flexible to allow it to be bulged radially outwardly through said openings to provide self-closing bleed passageways for escape of lubricant.

6. A ball joint assembly comprising:

(A) a ball point stud having a ball head at one end;

(B) a support member fixedly receiving the other end of said stud;

(C) a ball joint housing rotatably journaled on said ball head;

(D) a resilient, thin-wall, cup-shaped element of rubber-like material including (1) a bottom end wall portion having an opening therein sealingly engaging the shank of said stud adjacent said support member, (2) a peripheral flange portion adjacent the cup open end sealingly engaging the ball joint housing, and (3) side wall portions extending between said bottom wall portion and said flange portion to sealingly interconnect said support member and said ball joint housing; and (E) a washer embedded in said flange portion and including (1) a cylindrical main body portion holding said flange portion against said housing and concentric with the axis of said stud, and (2) spaced teeth portions integral with the end of said main body portion remote from said support member and each including (a) a portion extending axially from said remote end followed by (b) a portion extending radially inwardly and sloping toward said support member, whereby to form L-shaped teeth which grip said ball joint housing at their free ends to resist removal of said cup-shaped element and define a plurality of openings between their axially extending portions, the rubber-like material of said cup shaped element being sufficiently flexible to allow it to be bulged radially outwardly through said openings to provide self-closing bleed passageways for lubricant.

7. A ball joint assembly according to claim 6, and further including (A) a rigidifying ring bonded to said bottom end wall portion and surrounding said opening and having an outer face arranged to have bearing contact with the adjacent face of said support member.

8. A ball joint assembly according to claim 6, wherein said main body portion is undulated, when viewed in a plane normal to the central axis thereof, over at least a portion of its circumference, whereby to allow radial expansion of said washer to accommodate ball point housings of varying diameter.

References Cited

UNITED STATES PATENTS

| | | | |
|---|---|---|---|
| 963,060 | 7/1910 | Noppel | 277—212 |
| 2,275,058 | 3/1942 | Draving | 85—36 |
| 3,021,148 | 2/1962 | Dickinson | 277—235 X |
| 3,024,050 | 3/1962 | Moskovitz | 287—90 |
| 3,175,834 | 3/1965 | Wallace et al. | 287—87 X |
| 3,262,706 | 7/1966 | Hassan | 287—90 X |

FOREIGN PATENTS

| | | |
|---|---|---|
| 1,007,277 | 2/1952 | France, |
| 10,753 | 5/1912 | Great Britain. |

CARL W. TOMLIN, *Primary Examiner.*

A. KUNDRAT, *Assistant Examiner.*

UNITED STATES PATENT OFFICE
CERTIFICATE OF CORRECTION

Patent No. 3,322,445                                    May 30, 1967

Morris Hassan

It is hereby certified that error appears in the above numbered patent requiring correction and that the said Letters Patent should read as corrected below.

Column 4, lines 35, 46, 48 and 54, and column 6, line 23, for "point", each occurrence, read -- joint --.

Signed and sealed this 24th day of September 1968.

(SEAL)
Attest:

Edward M. Fletcher, Jr.                          EDWARD J. BRENNER
Attesting Officer                                  Commissioner of Patents